Oct. 21, 1947.  A. M. YOUNG  2,429,502
CAPTIVE HELICOPTER — KITE MEANS
Filed Aug. 21, 1943  3 Sheets-Sheet 1
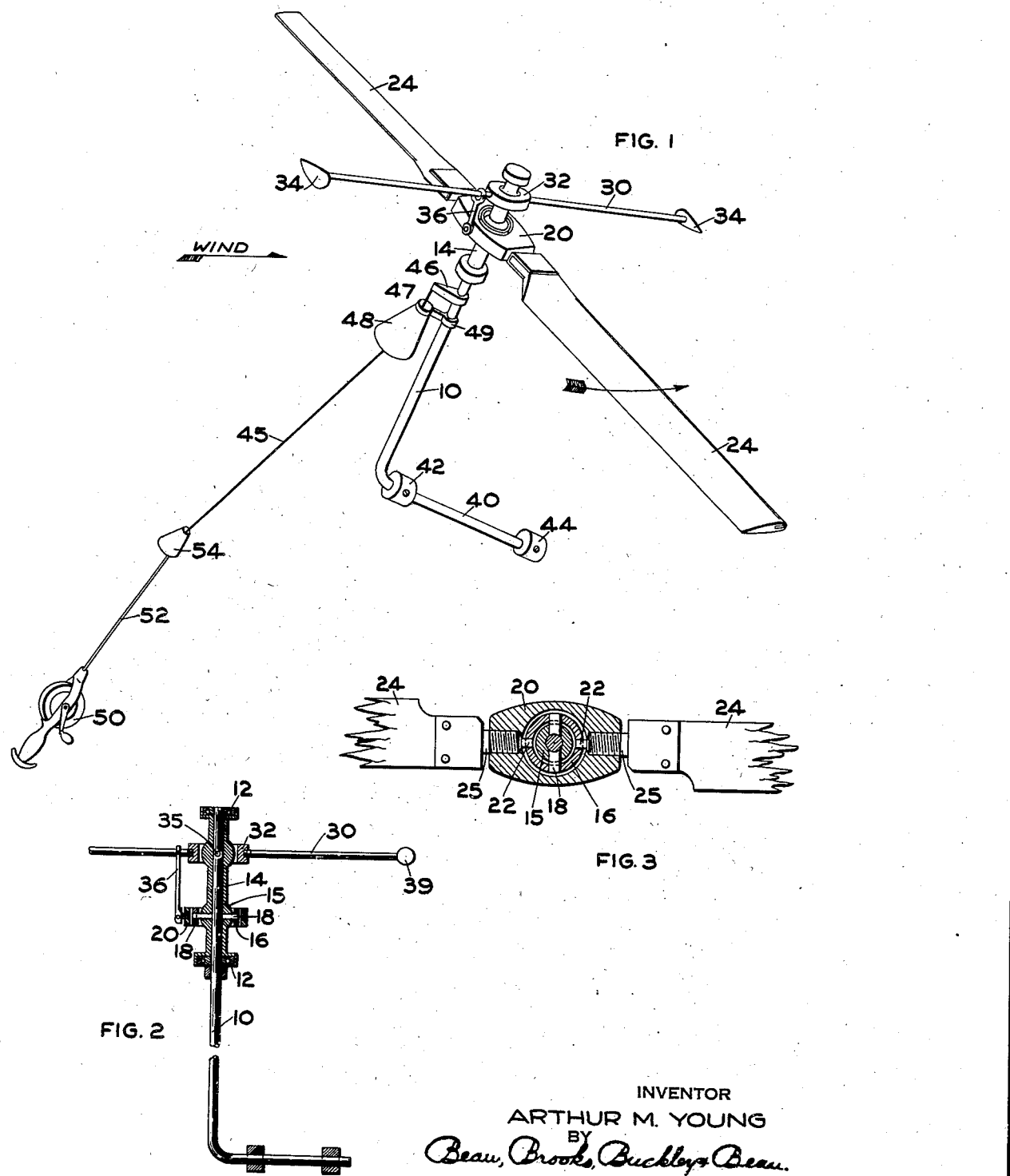
INVENTOR
ARTHUR M. YOUNG
BY
Beau, Brooks, Buckley & Beau.
ATTORNEYS Oct. 21, 1947.  A. M. YOUNG  2,429,502
CAPTIVE HELICOPTER – KITE MEANS
Filed Aug. 21, 1943  3 Sheets-Sheet 2

INVENTOR
ARTHUR M. YOUNG
BY
Beau, Brooks, Buckley & Beau.
ATTORNEYS

Oct. 21, 1947.   A. M. YOUNG   2,429,502
CAPTIVE HELICOPTER — KITE MEANS
Filed Aug. 21, 1943   3 Sheets-Sheet 3
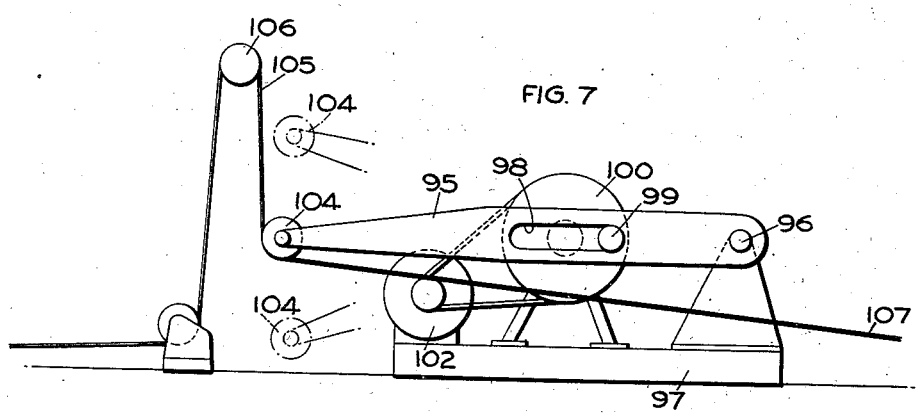
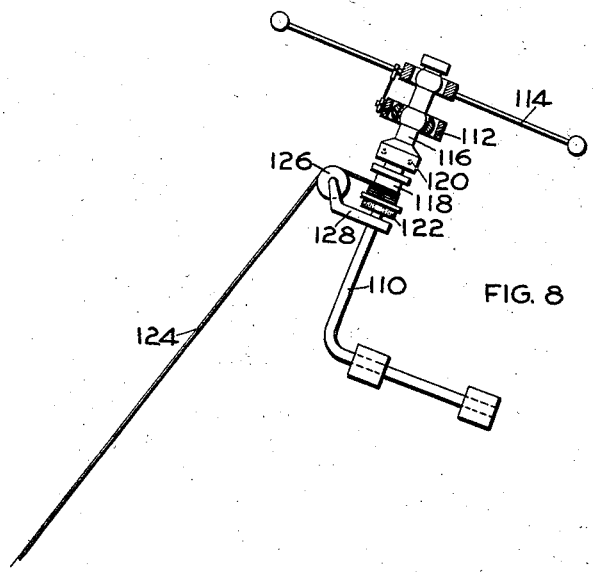
INVENTOR
ARTHUR M. YOUNG
BY
*Beau, Brooks, Buckley & Bean*
ATTORNEYS Patented Oct. 21, 1947

2,429,502

UNITED STATES PATENT OFFICE 2,429,502

CAPTIVE HELICOPTER-KITE MEANS

Arthur M. Young, Buffalo, N. Y.

Application August 21, 1943, Serial No. 499,458

18 Claims. (Cl. 244—154)

This invention relates to helicopter and autorotative wing type aerial devices. More specifically the invention relates to improvements in means for holding such devices captive; and the invention has particular application to captive aircraft and kites or the like such as may be used for carrying personnel or instruments for military or meteorological observation purposes, or the like.

It is a primary object of the invention to provide an improved rotative type aerial device, and improved means for maintaining such device captive, whereby the device per se is of improved inherent stability and whereby the captive cable means is arranged to act upon the aerial device in such manner as to avoid disturbing the equilibrium thereof and to assist in stabilization thereof against external influences such as variable wind forces or the like. Other more specific objects and advantages of the invention will appear from the specification hereinafter.

The invention is applicable to either power-driven helicopter type aerial devices or to rotary wing kites such as have no motor units therein and which rely upon relative winds to provide climb and sustaining forces. It will be understood, however, that the type of kite referred to is of such characteristics as to be flown in the absence of suitable relative winds by alternately pulling and releasing the cable holding the kite captive; in which case the kite might be said to come within the helicopter classification.

In the drawings:

Fig. 1 illustrates a rotary wing kite of the invention connected to a tethering cord leading to a pole and reel arrangement for flight control purposes;

Fig. 2 is a fragmentary vertical section through the kite mast and rotor mount and control mechanism of Fig. 1;

Fig. 3 is a fragmentary plan of the rotative wing mechanism, showing the mounting hub in section;

Figure 4:
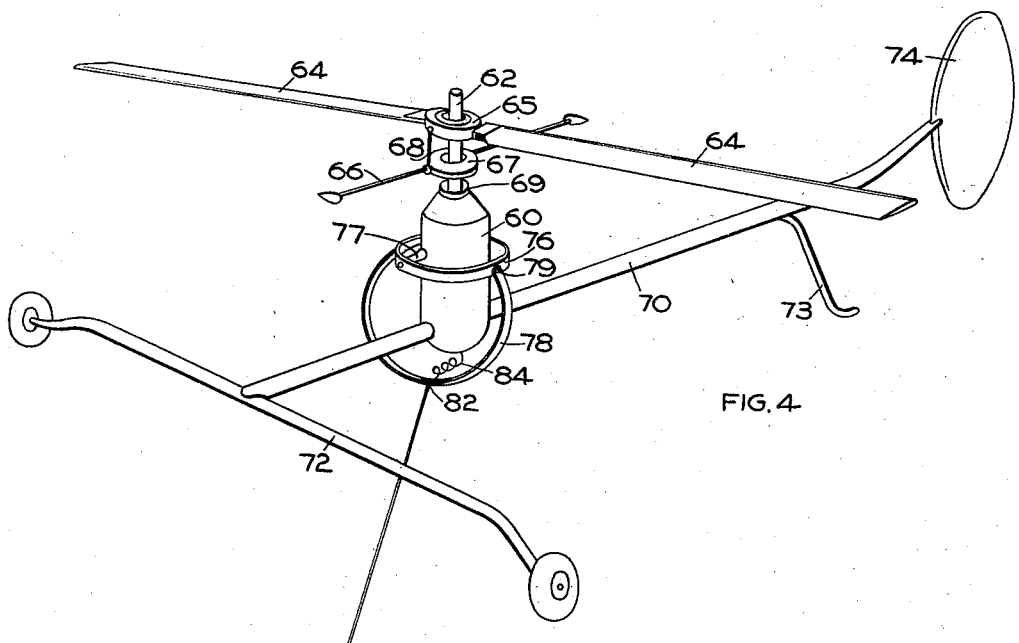
Fig. 4 illustrates a powered helicopter of the invention held captive by a cable and power controlled windlass.
Figure 6:
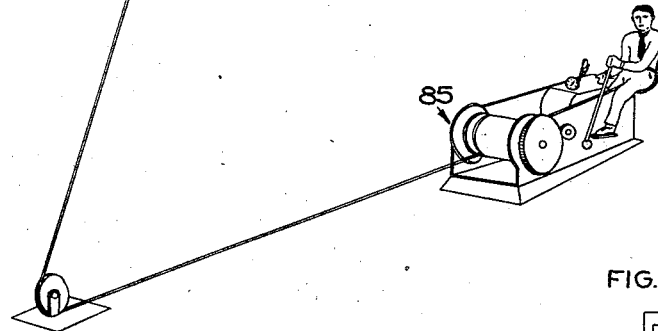
Figure 5:
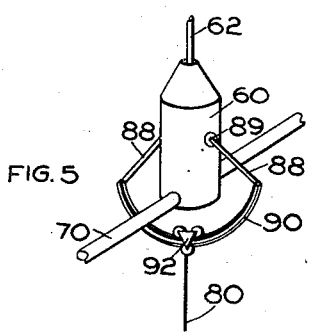

Fig. 5 relates to the type of helicopter of Fig. 4 but shows another form of captive cable connection to the helicopter;

Fig. 6 illustrates power supply means for the helicopter of Figs. 4–5, arranged in connection with the captive cable control windlass;

Fig. 7 illustrates a captive cable reciprocating device for use in alternately tugging and releasing the captive cable of an otherwise non-powered kite arrangement of the invention; and Fig. 8 illustrates another means for transmitting tugging power impulses to the rotating wing mechanism from a ground station.

As illustrated in Figs. 1–3, the kite of the invention may be formed to comprise a mast 10 carrying bearings 12—12 which mount a sleeve 14 so as to be freely rotatable about the axis of the mast.

The sleeve 14 includes a hub portion 15 upon which is pivoted a ring 16 by means of diametrically opposed pivot pins 18 extending from the hub. A rotor hub 20 is pivotally mounted relative to the ring 16 by means of aligned pins 22—22 which extend from the ring 16 at right angles to the direction of the pivot pins 18—18; and thus the rotor hub 20 is mounted relative to the mast 10 so as to be universally pivotable thereon as well as rotatable thereon. Rotor blades 24—24 are mounted by means of extending stub shafts 25—25 upon the hub 20 so as to extend therefrom in diametrically opposed relation and to be rotatable as a unit therewith and with the mast 10.

Adjacent its upper end the sleeve 14 mounts a stabilizing bar 30; said bar comprising a pair of diametrically opposed struts rooted upon a hub 32 and carrying corresponding weight masses 34—34. The hub 32 is pivoted to the sleeve 14 by means of pins 35, whereby the hub 32 is rockable relative to the mast 10 about an axis disposed parallel to the direction of extension of the rotor blades 24—24. A tie rod 36 pivotally connects at its upper end to the stabilizer bar 30 at a position offset from the axis of rotation of the rotor; and at its lower end to the rotor hub 20 at a similarly offset position thereon; whereby rocking of the stabilizer bar 30 relative to the mast 10 will be automatically accompanied by rotation of the rotor blade unit about its longitudinal axis in a similar direction. Thus, it will be understood that the rotor-stabilizer bar unit is mounted to rotate with the sleeve 14 about the mast 10, and that the rotor is adapted to be driven to rotate about the axis of the mast in response to relative wind pressure forces directed thereagainst.

For example, if the mast be disposed substantially vertically, as in Fig. 1, and the relative wind is moving in the direction indicated by the arrow, the rotor will be thereby caused to revolve in counterclockwise direction as viewed in Fig. 1. Such operation of the rotor will provide a lift force tending to cause the aerial device to be air-borne in either hovering or rising condition. The functional elements of the machine are so provided and arranged as to cause, through the action of the stabilizer bar 30, the rotor to maintain a position perpendicular to the average position of the rotor supporting mast. In turn, the average position of the mast is governed by the disposition of the masses comprising the machine structure. Thus, the operation of the inertia bar makes the rotor independent of transient oscillations of the mast, and the effects thereof cannot operate to upset the machine.

To provide further for stability of the aerial device of Figs. 1–3 when held captive, a counterbalance is employed as illustrated to comprise a laterally disposed arm 40 extending approximately at right angles to the mast 10. The arm 40 carries a weight 42 at approximately the base of the mast 10, and a second weight 44 is carried at the outer end of the arm 40 so as to be disposed at a position a substantial distance from the mast 10. A tethering cable is attached to the mast 10 by means of an outrigger strut 46 extending rigidly from the mast 10 in a direction therefrom opposite to the direction of the extension of the balance arm 40. The cable 45 is connected to the outrigger strut 46 at a location 47 disposed ahead of the mast 10 and vertically of the mast 10 between the position of the rotor and the balance weights 42—44 and preferably on the elevation of the center of gravity of the entire machine. A cone shaped sleeve 48 is carried by means of a bracket 49 to extend below the cable connection point 47 in such manner that the cable 45 is adapted to thread through the sleeve and to be maintained thereby against entangling interferences with the rotor blades 24—24 whenever the tethering cable 45 leads away from the mast 10 at a sharp angle, as when the aerial device is relatively close to the ground.

The lower end of the cable 45 is wound upon a reel 50 and a rod 52 is arranged to extend from the reel and to carry at its free end a sleeve 54 through which the cable 45 threads while passing from the reel to the aerial device. Thus, it will be understood that manual manipulation of the reel will cause the cable to be wound or released therefrom so as to regulate the height of the aerial device from the ground control station. The reel is preferably provided with a hand brake; and either a manual or power-operated mechanism for reeling-in the tethered cord 45. The sleeves 48—54 are formed so as to be adapted to telescopically engage upon lowering of the kite into close coupled relation with reel-rod device. Thus, the cones cooperate to position the tethered kite at the end of the reel-rod while avoiding interferences between the control equipment and the rotating kite rotor.

As stated, the tethering bracket 46 is preferably positioned vertically of the mast 10 in particular manner so as to dispose the point of tethering pull upon the aerial device at approximately the elevation of the center of gravity of the entire machine; that is, the air-borne assembly exclusive of the tethering cable and control rod-reel device. Also, the point of cable attachment to the aerial device is arranged, through use of the bracket 46, to be ahead of the mast (and of the axis of rotation of the rotor) at a distance therefrom approximating 4% or 5% of the rotor track diameter. In any case the distance between the location of the tethering connection 47 and the center of the mast 10 is a critical one and upon final assembly of the aerial device can best be determined by trial. For example, if the connection point 47 is too close to the mast the kite will tend to pull excessively against the tethering cable and will not possess optimum vertical climbing characteristics. If the connection point 47 is too far forwardly of the mast, the kite will tend to climb into a position directly above the ground captive station and will not pull with the relative wind against the tethering cable to a degree sufficient to provide good stability and control characteristics. I have also determined that best results may be obtained by arranging that the center of gravity of the entire kite assembly be located behind the center of the mast at a distance therefrom equal to approximately 5% of the diameter of the rotor track. The exact location of this center of gravity position may be readily regulated by sliding the weight 44 back and forth on the arm 40.

A kite embodying the features illustrated in Figs. 1–3 and described hereinabove is adapted to be launched and to hover over the captive control position in improved manner. For example, the kite may be launched by simply trailing it in a relative wind from the control cable 45; and the rod-reel device 52 is adapted to assist in making this maneuver convenient by preventing entanglements of the control cable with the rotor blades until the kite becomes stabilized in airborne attitude above the captive control station. As explained hereinabove, the relative wind acts against the rotor to drive the latter to revolve about the mast, and the lift forces generated by the rotor rotation pulls the kite upwardly to the limit permitted by the tethering cable. Upon becoming air-borne, the mast and counterbalance arm unit 10—40 assumes a tilted attitude as illustrated in Fig. 1, thereby disposing the center of gravity of the entire kite assembly slightly below the rotor and close to the tethering point 47 and at a position rearwardly thereof.

The lift forces of the rotor pull upon the mast in a direction axially thereof; and thus the composition of lift and tethering pull and center of gravity forces acting upon the kite device establishes a self-stabilizing flight force system. For example, the effects of variable wind or gust forces will be automatically resisted by reactions between the correspondingly varying induced lift forces of the rotor caused by virtue of the couple produced by the pull of the tethering cable. As for example, a stronger gust causes an increased lift which in turn tips the rotor forward, which in turn reduces its lift; thereby establishing conditions for equilibrium. As previously explained, the stabilizer bar device operates automatically to stabilize the machine against self-induced oscillations.

Fig. 4 illustrates a captive motor-driven helicopter of the invention wherein the body of the machine incorporates a motive power supply means such as an electric motor at 60 having a power output shaft connected to the helicopter mast 62. Rotor blades 64—64 are carried by a hub 65 and mounted in the manner of the rotor arrangement of Fig. 1. Likewise, a stabilizing bar 66 is carried by a hub 67 upon the mast and linked to the rotor hub 65 by means of a tie rod 68, whereby the rotor and mast unit is arranged to automatically resist shifting of the rotor track relative to the mast axis and to restore the system to the normal relation thereof subsequent to disturbances, as explained in connection with Fig. 1. Thus, it will be understood that the kite arrangement of Fig. 4 is generally similar to that of Fig. 1 except that the rotor of Fig. 4 is arranged to be power-driven by the motor 60. A free wheeling device is preferably incorporated as at 69 in the coupling between the motor 60 and the mast 62, whereby it will be understood that power may be supplied to the rotor by the kite operator for climbing purposes or under quiet atmosphere conditions; and that upon attainment of desired altitude or under flight-sufficient wind conditions the motor 60 may be de-energized, and the rotor will then free-wheel or operate as an "auto-gyro" as explained hereinabove in connection with the kite of Fig. 1.

The kite of Fig. 4 is provided with a fuselage comprising a simple longitudinal strut 70 and a transverse landing gear strut 72. A tail skid 73 is arranged at the rear end of the main strut 70 to complete a three point landing gear structure for the machine. At the extreme tail of the fuselage there is mounted a fixed vertical fin 74; and the fuselage and fin unit is so formed and arranged that the center of keel effect thereof lies in a line extending perpendicular to the rotor axis and intersecting the center of gravity of the entire machine.

A tethering link of novel form is coupled to the body of the machine at substantially the elevation of the center of gravity of the entire machine, and preferably at a position slightly forward of said center of gravity position. This may be conveniently arranged, for example, if the kite structure is formed so as to have its center of gravity slightly behind the axis of the mast 62 by comprising the tethering device to consist of a gimbal ring 76 carried by diametrically opposed pivot pins 77 extending from the motor casing 60, and a looped strap 78 which is pivoted at diametrically opposed positions 79—79 to the ring 76 so as to be pivotable relative thereto about an axis transverse to the axis of the pivot pins 77. The tethering cable 80 is connected to the free end of the bail 78, as at 82; and thus it is arranged that the pull of the cable 80 will be directed through the bail 78 and the ring 76 into the body portion of the helicopter.

This arrangement of the gimbal ring connection centers the tethering forces of the cable 80 upon the machine at a position slightly ahead of the center of gravity of the entire machine and at approximately the same elevation thereof. Thus, the pull of the cable 80 will exert no upsetting forces upon the machine such as if the tethering connection were centered at a position above or below the center of gravity of the entire machine. For example, if the pull of the cable 80 were to be centered upon the machine below the center of gravity thereof, and if the machine thereupon moved laterally, it would receive a couple from the cable which would tend to tip the mast away from the ground tethering station so that the machine would tend to pull away in the same direction in such manner as to further aggravate the effects of the initial disturbing forces, whereby in a short time the machine would upset and crash to the ground. On the other hand, I have determined that if the tethering cable were to be arranged to center the cable pull upon the machine at a position above the center of gravity, forces would be thereby imposed upon the machine such as would tend to cause it to oscillate or rush to and fro above the tethering station.

The arrangement for centering the tethering pull at a position forward of the center of gravity and forwardly of the rotor axis produces, however, highly desirable results in that the machine is thereby provided to be automatically self-stabilizing under varying wind velocity conditions. It seems, for example, whenever a wind gust gets under the rotor and increases its pull, the tethering cable thereupon applies a diving moment to the machine which tips it forward so that the air flow through the rotor is reduced and the lift decreases to a corresponding degree. Reversely, when the wind force decreases, the cable pull correspondingly decreases and thus permits the nose of the machine to rise so that the wind strikes the rotor at an angle from therebelow, thereby increasing the lift-effects upon the machine.

Power supply means for the motor 60 may be supplied in the form of electrical conductors as illustrated at 84 arranged to be carried by the tethering cable 80. As shown in Fig. 4, the tethering cable may be conveniently connected to a power driven windlass 85; and as illustrated in Fig. 6 the windlass shaft may include collector ring and brush elements 86 arranged in electrical connection with a power supply circuit designated 87. It will be understood, however, that any other suitable means for energizing the motor 60 as controlled by the operator, may be employed in lieu of the specific arrangements shown an described herein.

Fig. 5 illustrates a modified form of gimbal ring tethering connection between the cable 80 and the helicopter body portion 60. This tethering connection device comprises a frame having oppositely extending arms 88 pivoted to the machine body at 89 and carrying a circular track portion 90 to extend between opposite ends of the arms 88—88 so as to encompass the adjacent body portion of the machine and to be free to swing relative thereto through substantial angles about the axis of the pivot connections 89—89 in directions longitudinally of the fuselage 70. The cable 80 is tethered to a carriage 92 which is mounted by means of rollers or other suitable friction-reducing means upon the track 90 so as to be freely movable therealong in directions transverse to the direction of pivotal movement of the tethering frame device. Thus, it will be understood that the pull of the cable 80 will be thereby centered upon a point interiorly of the body portion 60; and that thereby the preferred arrangement of the tethering connection relative to the center of gravity of the machine may be obtained for the purposes explained hereinabove. The tethering connection arrangement of Fig. 5 lends itself with particular advantage to the case where body portions of the machine occupy the space forward and behind the center of gravity, such as would prohibit the use of the double gymbal arrangement in Fig. 4.

Fig. 7 illustrates a mechanism which may be employed at the tethering control station for supplying energy to the captive helicopter or kite, as may be required to maintain a flight condition in the absence of sufficient relative wind. The mechanism of Fig. 7 provides for alternately tugging upon and releasing the tethering cable; and each pull-in stroke is arranged to be performed at a much faster rate than the rate of intermediate release. Thus, operation of the tug device causes a relatively violent down-stroke which operates to store energy in the helicopter rotor by causing it to auto rotate at an increased speed, whereupon the kite will climb to a higher altitude when the cable is subsequently released. In this manner the kite or helicopter can be kept well overhead with respect to the captive ground station, even in relatively quiet air.

To provide the above operation the cable manipulating mechanism is constructed to comprise a walking beam 95 pivoted at 96 upon a base 97 and slotted at 98 intermediately of its ends to ride upon a crank 99 which is carried by a reel 100 driven by a motor 102. A pulley 104 at the end of the beam 95 bears against a portion of the cable 105 which trains between a positionally fixed pulley 106 and the tethered end portion 107 of the cable; and the cable support and walking beam elements are arranged to provide that the walking beam will press against the cable 105 during each down stroke and to thereby pull the cable over the fixed pulley 106 so as to reel-in the cable end which is tied to the kite. The crank 99 causes the beam 95 to oscillate in such manner that the down pulls upon the cable 105 are accomplished within time intervals of much shorter duration than the time intervals during which the cable is released during rising of the beam 95. The end portion 107 of the cable may be paid out or drawn in as desired by the operator while the beam 95 is oscillating.

Fig. 8 shows another form of power supply means for the kite or helicopter of the invention. In this case the mast is designated 110; the rotor 112; the stabilizer bar 114; and the rotor drive sleeve 116. A reel 118 is rotatably mounted upon the mast and is operatively connected to the rotor drive sleeve 116 by means of a free-wheeling coupling 120. A clock-type spring 122 is arranged in connection with the reel and the mast for returning the reel to normal position relative to the mast upon being released from rotative pulls thereon. The upper end of the kite tethering cable 124 is wound about the reel 118 and tied thereto at the extreme end portion of the cable. Thus, alternately pulling and releasing the cable 124 from the ground station will cause the reel to rotate in reverse directions about the mast, and the reel rotations caused by the down pulls upon the cable will be transmitted through the coupling 120 to drive the rotor unidirectionally, while the free-wheeling coupling permits the reel to return in response to the pull of the spring 122 to normal position upon the mast incidental to each releasing movement of the cable 124. To guide the cable in connection with the reel 118 a pulley 126 is carried by means of a bracket 128 extending forwardly of the mast 110 and so disposed as to center the tethering pull of the cable 124 relative to the aerial machine at a position slightly ahead of the center of gravity of the entire machine and approximately at the elevation of the center of gravity thereof, whereby the stability and control characteristics of the invention described hereinabove are obtained.

I claim:

1. In an aircraft, a body, a rotor, means mounting said rotor on said body for rotation about a generally upright axis and for universal inclination relative thereto, said rotor comprising a blade support and a blade extending radially from said axis, means mounting the blade on the support for rotation generally about the longitudinal axis of said blade, a rotary inertia means mounted on said body and rotating about an axis generally parallel but universally inclinable to the axis of the rotation of said rotor, displaceable means interconnecting said rotary inertia means and said rotor and operably responsive to universal inclination of said rotating inertia means to vary the incidence of the blade of said rotor in such direction as to cause the plane of rotation of said rotor to tend to approach parallelism with the plane of rotation of the inertia means, and means extending from said body for connection to a captive device and so arranged as to direct the tethering forces thereof into said body at a position ahead of the center of gravity of the entire aircraft and ahead of said rotor axis and below said rotor and at approximately the elevation of said center of gravity.

2. In an aircraft, a body, a lift rotor comprising a hub and rotor blade means extending therefrom, means mounting said rotor upon said body for rotation relative thereto about a generally upright axis and for universal inclination of the rotor relative to said body, means mounting said rotor for rotary adjustment about the longitudinal axis of said blade means, inertia means mounted upon said body to rotate relative thereto as a unit with said rotor and about an axis generally parallel but universally inclinable to the axis of rotation of said rotor, said inertia means being pivotable relative to said body about an axis disposed parallel to the direction of extension of said rotor blade means, means linking said rotor to said inertia means whereby to enable said inertia means to transmit its inclination or a part thereof to said rotor, and means extending from said support for connection to a captive device and so arranged as to direct the tethering forces thereof into said body at a position ahead of the center of gravity of the entire aircraft and ahead of said rotor axis and below said rotor and at approximately the elevation of said center of gravity.

3. A captive aircraft including a rotor, means mounting said rotor upon said aircraft for rotation about an upright axis and for universal inclination of the rotor relative to said aircraft, rotary inertia means mounted upon said aircraft to rotate as a unit with said rotor, said inertia means being inclinable relative to said aircraft, means linking said rotor and said inertia means whereby to cause them to similarly incline relative to said aircraft, and means extending from said aircraft for connection to captive means such as a cable at approximately the elevation of the center of gravity of the entire aircraft.

4. An aircraft comprising a support, a lift rotor comprising a hub and rotor blade means extending therefrom, means mounting said rotor upon said support for rotation relative thereto and for universal inclination of the rotor relative to said support, inertia means mounted upon said support to rotate relative thereto about an axis generally parallel to the axis of rotation of said rotor and as a unit with said rotor, said inertia means being pivotable relative to said support about an axis disposed parallel to the direction of extension of said rotor blade means, means linking said rotor to said inertia means whereby to enable the latter to transmit its inclination or a part thereof to said rotor, and means extending from said support for connection to a captive device at a position ahead of the center of gravity of the entire aircraft and ahead of said rotor axis and below said rotor and at approximately the elevation of said center of gravity.

5. A captive aircraft including a rotor blade, means mounting said rotor blade upon said aircraft for rotation about an upright axis and for inclination about an axis generally longitudinal of the rotor blade, rotary inertia means mounted upon said aircraft to rotate as a unit with said rotor blade, said inertia means being inclinable relative to said mast, means linking said rotor and said inertia means whereby to cause them to similarly incline relative to said aircraft, and means extending from said aircraft for connection to captive means such as a cable at a position ahead of the position of the center of gravity of the entire aircraft and ahead of said upright axis and at approximately the elevation of said center of gravity.

6. An aircraft comprising a support, a lift rotor comprising a hub and rotor blade means extending therefrom, means mounting said rotor upon said support for rotation relative thereto and for universal inclination of the rotor relative to said support, inertia means mounted upon said support to rotate relative thereto as a unit with said rotor, said inertia means being pivotable relative to said support about an axis disposed parallel to the direction of extension of said rotor blade means, means linking said rotor to said inertia means whereby to approximately synchronize inclinations thereof relative to said support, and means extending from said support for connection to a captive device and so arranged as to direct the tethering forces thereof into said aircraft at a position ahead of said rotor axis and at approximately the elevation of the center of gravity of the entire aircraft.

7. In combination, a rotative wing aircraft including a rigid body, a lift rotor carried by said body to rotate about an upright axis, a tethering device for holding said aircraft captive, and connection means carried by said aircraft body and connected to said tethering means, said connection means comprising a gimbal ring mounted upon said body to encircle the latter and to pivot thereon at the approximate elevation of the center of gravity of the entire aircraft, and a bail device mounted upon said gimbal ring to be pivotable relative thereto about an axis perpendicular to the axis of mounting of said ring upon said body and to extend at a swinging end portion thereof below said body, and means connecting one end of the tethering device to said bail device at said swinging end portion thereof.

8. In combination, a rotative wing aircraft including a rigid body, a lift rotor carried by said body to rotate about an upright axis, a tethering device for holding said aircraft captive, and connection means carried by said aircraft body and connected to said tethering means, said connection means comprising a bail device mounted upon said body to be pivotable relative thereto about an axis disposed transversely thereof at a position ahead of the center of gravity of said aircraft and at approximately the elevation of said center of gravity, said bail device extending from said pivotal connection to encircle the bottom portion of said body and formed to comprise arcuate-shaped track means, and a coupling device carried by said track means to be freely movable therealong and connected to said tethering device, whereby the pull forces of said tethering device will be at all times centered upon said aircraft body at a position centrally thereof and ahead of the center of gravity thereof and at the approximate elevation of said center of gravity.

9. In combination, a rotative wing aircraft, a tethering device for said aircraft comprising a flexible cable connected at one end to said aircraft and at its other end to a fixed support, and a cable tugging device comprising a crank arm, means mounting said crank arm for reciprocation thereof, bearing means carried by said crank arm at a reciprocating portion thereof and arranged to bear against said tethering cable at a position intermediately of its ends to laterally deflect the latter, and motor means geared to said crank arm and adapted to cause the latter to reciprocate whereby to transmit alternate tugging and releasing impulses through said cable to said aircraft.

10. In combination, a rotative wing aircraft, a tethering device for said aircraft comprising a flexible cable connected at one end to said aircraft and at its other end to a fixed support, and a cable tugging device comprising a crank arm, means mounting said crank arm for reciprocation thereof, bearing means carried by said crank arm at a reciprocating portion thereof and arranged to bear against said tethering cable at a position intermediately of its ends to laterally deflect the latter, motor means, and means gearing said motor means and said crank arm together for driving the latter to transmit alternate tugging and releasing impulses through said cable to said aircraft, said gearing means being arranged to provide said tugging impulses to be relatively rapidly applied and said releasing impulses to be relatively slowly applied to said cable.

11. A rotative wing aircraft comprising a body portion, a mast mounted upon said body portion to rotate relative thereto about an upright axis, a lift rotor blade mounted upon said mast to rotate therewith and to be inclinable universally of the mast axis, said rotor being also mounted upon said mast so as to be pivotable about the longitudinal axis of the rotor blade, and inertia means carried by said mast to rotate therewith and to be pivotable relative thereto about an axis substantially parallel to said blade longitudinal axis, link means interconnecting said inertia means and said rotor blade to enable said inertia means to transmit its inclinations or parts thereof to said rotor, and power supply means for causing said mast to rotate comprising a flexible cable device extending from a station exteriorly of the aircraft, a spool rotatably mounted upon said aircraft and having an end portion of said cable reeled thereon, spring means interconnecting said spool and said aircraft to resiliently resist cable unreeling rotation of said spool, and a free-wheeling coupling device associating said spool and said mast for driving the latter to rotate said rotor blade to provide aircraft lift forces in response to unreeling pulls upon said cable and to free said spool from said mast during reverse rotations of said spool.

12. A rotative wing aircraft comprising a body portion, a mast mounted upon said body portion to rotate relative thereto about an upright axis, a lift rotor blade mounted upon said mast to rotate therewith and to be inclinable universally of the mast axis, said rotor being also mounted upon said mast so as to be pivotable about the longitudinal axis of the rotor blade, and inertia means carried by said mast to rotate therewith and to be pivotable relative thereto about an axis substantially parallel to said blade longitudinal axis, link means interconnecting said inertia means and said rotor blade for synchronizing inclinations thereof relative to said mast, and power supply means for causing said mast to rotate comprising a flexible cable device extending from a station exteriorly of the aircraft, a spool rotatably mounted upon said aircraft and having an end portion of said cable reeled thereon, spring means interconnecting said spool and said aircraft to resiliently resist cable unreeling rotation of said spool, and a free-wheeling coupling device associating said spool and said mast for driving the latter to rotate said rotor blade to provide aircraft lift forces in response to unreeling pulls upon said cable and to free said spool from said mast during reverse rotations of said spool, and a cable tugging device comprising a crank arm, means mounting said crank arm for reciprocation thereof, bearing means carried by said crank arm at a reciprocating portion thereof and arranged to bear against said tethering cable at a position intermediately of its ends to laterally deflect the latter, and motor means geared to said crank arm and adapted to cause the latter to reciprocate whereby to transmit alternate tugging and releasing impulses through said cable to said aircraft.

13. In combination, a rotative wing aircraft, a tethering device for said aircraft, means carried by said aircraft and connected to said tethering device in such manner as to center the tethering forces of said tethering device upon said aircraft at a position ahead of the center of gravity of said aircraft and at approximately the elevation thereof, motor means carried by said aircraft body, and motor power conductive means carried by said tethering cable and extending therefrom into powering connection with said motor means.

14. In combination, a rotative wing aircraft, a tethering cable mounted at one end thereof upon a windlass reel, coupling means carried by said aircraft and connected to the other end of said tethering cable in such manner as to center the tethering forces of said tethering cable upon said aircraft at a position ahead of the center of gravity of said aircraft and at approximately the elevation thereof, electric motor means carried by said aircraft for driving the rotative wing means thereof, electricity conductor means carried by said tethering cable and extending therefrom at one end into powering connection with said motor means and at the other end thereof to slip-ring and brush electrical connection devices carried by said reel and coupled to an electrical power supply source.

15. In an aircraft, a body, a rotor, means mounting said rotor on said body for rotation about a generally upright axis and for universal inclination relative thereto, said rotor comprising a blade support and a blade extending radially from said axis, means mounting the blade on the support for rotation generally about the longitudinal axis of said blade, a rotary inertia means mounted on said body and rotating about an axis generally parallel but universally inclinable to the axis of the rotation of said rotor, displaceable means interconnecting said rotary inertia means and said rotor and operably responsive to universal inclination of said rotating inertia means to vary the incidence of the blade of said rotor in such direction as to cause the plane of rotation of said rotor to tend to approach parallelism with the plane of rotation of the inertia means, and means extending from said body for connection to a captive device.

16. A captive aircraft including a rotor means mounting said rotor upon said aircraft for rotation about an upright axis and for universal inclination of the rotor relative to said aircraft, rotary inertia means mounted upon said aircraft to rotate as a unit with said rotor, said inertia means being inclinable relative to said aircraft, means linking said rotor and said inertia means whereby to cause them to similarly incline relative to said aircraft, and means extending from said aircraft for connection to captive means such as a cable.

17. A mooring device for an aircraft including universally arcuate guiding means attached below the aircraft and mooring line attachment means freely movable along said guide means.

18. A mooring device for an aircraft including an arcuate guide mounted below the aircraft and an attachment fitting for a mooring line mounted upon said guide and movable relative thereto.

ARTHUR M. YOUNG.

REFERENCES CITED

The following references are of record in the file of this patent:

UNITED STATES PATENTS

| Number | Name | Date |
|---|---|---|
| 1,302,007 | Calthrop | Apr. 29, 1919 |
| 2,181,477 | Chupp | Nov. 28, 1939 |

FOREIGN PATENTS

| Number | Country | Date |
|---|---|---|
| 415,069 | France | July 4, 1910 |
| 815,811 | France | Apr. 19, 1937 |